United States Patent
Jain et al.

(10) Patent No.: US 9,819,454 B2
(45) Date of Patent: Nov. 14, 2017

(54) WIRELESS COMMUNICATION APPARATUS AND METHOD FOR HARQ BUFFER MANAGEMENT

(71) Applicants: Nitin Jain, New Delhi (IN); Maneesh Gupta, Faridabad (IN)

(72) Inventors: Nitin Jain, New Delhi (IN); Maneesh Gupta, Faridabad (IN)

(73) Assignee: NXP USA, INC., Austin, TX (US)

(*) Notice: Subject to any disclaimer, the term of this patent is extended or adjusted under 35 U.S.C. 154(b) by 50 days.

(21) Appl. No.: 14/568,087

(22) Filed: Dec. 11, 2014

(65) Prior Publication Data

US 2016/0174216 A1    Jun. 16, 2016

(51) Int. Cl.
*H04J 3/00*     (2006.01)
*H04L 1/18*     (2006.01)

(52) U.S. Cl.
CPC .......... *H04L 1/1812* (2013.01); *H04L 1/1809* (2013.01); *H04L 1/1822* (2013.01); *H04L 1/1835* (2013.01); *H04L 1/1819* (2013.01)

(58) Field of Classification Search
None
See application file for complete search history.

(56) References Cited

U.S. PATENT DOCUMENTS

| | | |
|---|---|---|
| 7,003,709 B2 | 2/2006 | Wengerter |
| 7,237,154 B1 | 6/2007 | Zorian |
| 7,499,417 B2 | 3/2009 | Kim |
| 7,898,882 B2 | 3/2011 | Darbinyan |
| 8,060,801 B2 | 11/2011 | Seol |
| 8,171,362 B2 | 5/2012 | Grovlen |
| 8,578,232 B2 | 11/2013 | Jongren |
| 2010/0272033 A1 | 10/2010 | Fwu |
| 2012/0054572 A1* | 3/2012 | Andersen ............ H04L 1/1845 714/748 |
| 2013/0215941 A1 | 8/2013 | Cho |
| 2014/0140273 A1* | 5/2014 | Kim ............... H04L 1/1812 370/328 |
| 2015/0189627 A1* | 7/2015 | Yang ............... H04L 5/0098 370/280 |

(Continued)

FOREIGN PATENT DOCUMENTS

WO    WO 2008081222 A1 *   7/2008   ......... H04L 1/1657

OTHER PUBLICATIONS

Rodolfo Torrea-Duran, Min Li, Claude Desset, Sofie Pollin, Liesbet Van der Perre; "Exploiting frequency correlation in LTE to reduce HARQ memory", Globecom 2012—Wireless Communications Symposium, IEEE 2012.

*Primary Examiner* — Kwang B Yao
*Assistant Examiner* — Hardikkumar Patel (57) ABSTRACT

A transmission node in a wireless communication network includes a receiving unit for receiving a set of data packets transmitted from a set of nodes in the network scheduled in one TTI, a memory unit having a number of memory blocks, each for storing a set of data packets transmitted in a separate TTI of a HARQ process. Each memory block includes sub-memory blocks, each of which is for storing a data packet transmitted from a separate UE. The transmission node further includes a processor for allocating the set of data packets to the sub-memory blocks and releasing the sub-memory blocks after one HARQ process upon receipt of the set of data packets.

20 Claims, 7 Drawing Sheets

(56) References Cited

U.S. PATENT DOCUMENTS

2015/0282130 A1* 10/2015 Webb .................. H04L 1/08
    370/329
2015/0305003 A1* 10/2015 Chen .................. H04L 1/1822
    370/330
2016/0056926 A1* 2/2016 Li .................... H04L 5/0044
    370/280

* cited by examiner

WIRELESS COMMUNICATION APPARATUS AND METHOD FOR HARQ BUFFER MANAGEMENT

BACKGROUND OF THE INVENTION

The present invention relates to a wireless communication apparatus, and, more particularly, to a method for reducing memory used for uplink (UL) Hybrid Automatic Repeat Request (HARQ) buffers.

Figure 1:
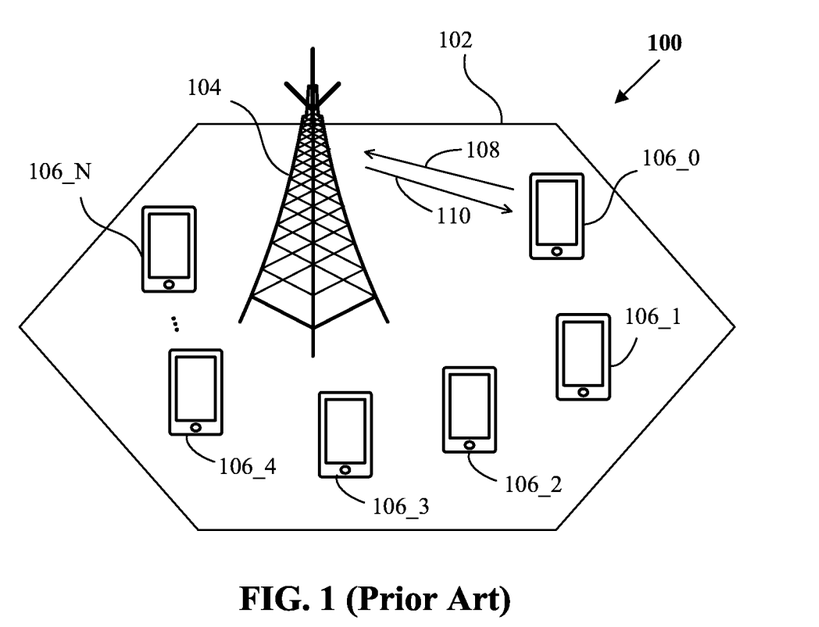
FIG. 1 shows a wireless communication network.

FIG. 1 shows a wireless communication network 100 including a cell 102, which is a coverage area of an eNodeB 104. An eNodeB (E-UTRAN Node B or Evolved Node B) is the element in E-UTRA (Evolved-Universal Terrestrial Radio Access) of Long Term Evolution (LTE) that is the evolution of the element Node B in UTRA of UMTS (Universal Mobile Telecommunication System). It is the hardware that is connected to the mobile phone network that communicates directly with mobile handsets (UEs), like a base transceiver station (BTS) in GSM (Global System for Mobile Communications) networks. A plurality of user equipments (UEs) 106_0-106_N in the cell 102 are communicating with the eNodeB 104 through an uplink 108 and a downlink 110.

Figure 2:
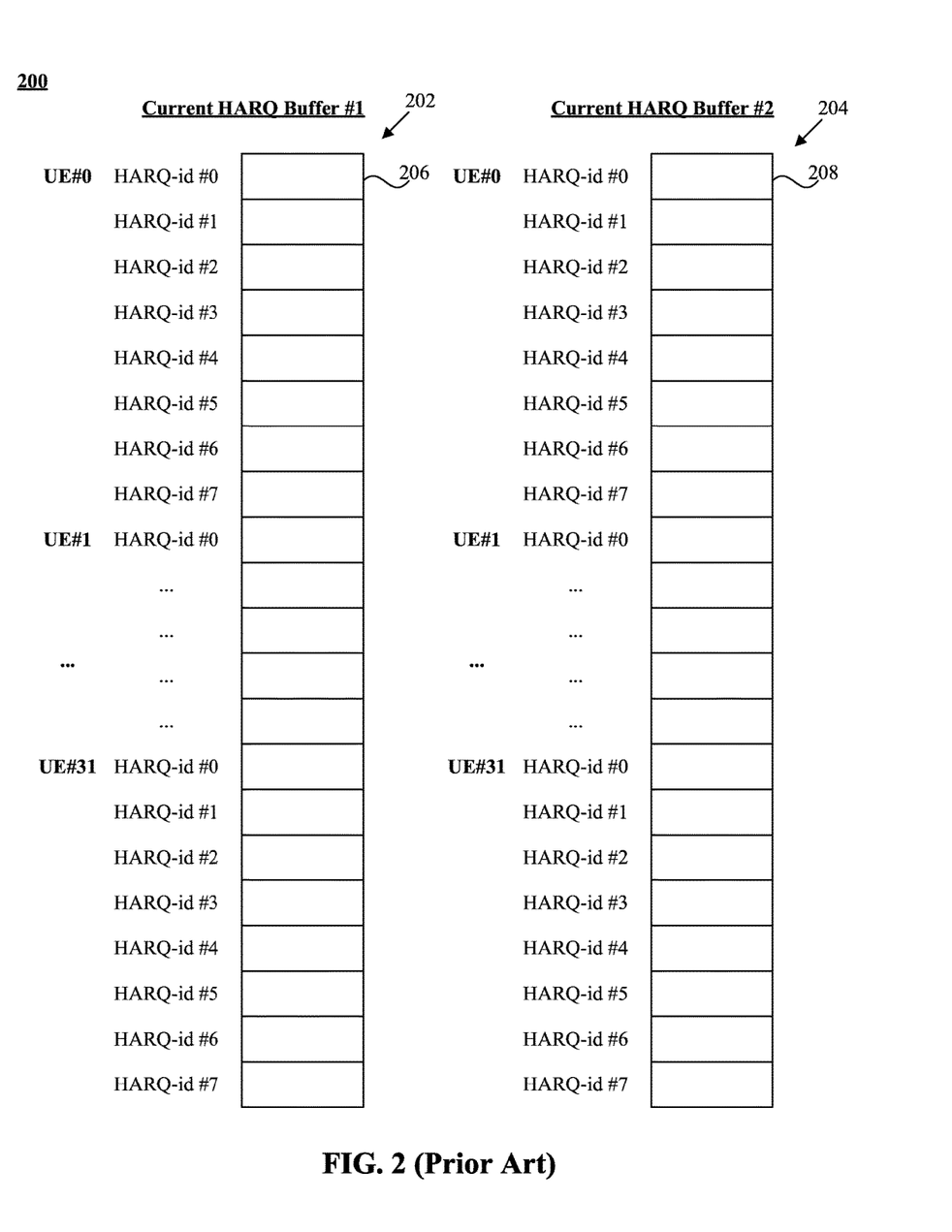
FIG. 2 illustrates a conventional HARQ buffer structure.

FIG. 2 is a conventional structure of HARQ buffers 202 and 204 in a memory unit 200 of the eNodeB 104. For example, in one UL HARQ process, with a HARQ ID HARQ-id#0, upon receipt of a data packet from the UE 106_0 through the uplink 108, the eNodeB 104 stores the UL data packet in a memory block 206 corresponding to the HARQ ID HARQ-id#0 and the UE 106_0. Upon successfully decoding the data packet, the eNodeB 104 sends an 'ACK' to the UE 106_0 through the downlink 110 to acknowledge the receipt of the data packet, and releases the memory block 206. If the data packet is not successfully decoded by the eNodeB 104, the eNodeB 104 sends a 'NACK' to the UE 106_0 through the downlink 110 to ask the UE 106_0 to re-transmit the data packet, and retains the memory block 206 for storing the re-transmitted data packet in a later HARQ process with the same HARQ ID. The eNobeB 104 also performs HARQ combining to combine the data packet and the re-transmitted data packet, and stores the combined data packet in memory block 208 to maintain integrity of data combining in case Channel Quality Indicator (CQI) or Rand Indicator (RI) measurements are invalid. The HARQ combining method includes Chase Combining (CC) and Incremental Redundancy (IR), which is known in the art. As shown in FIG. 2, the memory size of the UL HARQ buffers for Frequency Division Duplexing (FDD) system is calculated as below:

UL HARQ buffers=2*number of UEs*number of HARQ processes*[maximum Code-Block (CB) size+tail length]*coding rate*number of CBs.

Since the conventional UL HARQ buffers in an FDD system are statically allocated for the UEs in the cell 102 and respective 8 HARQ-IDs of the UEs, the amount of memory for UL HARQ buffers increases linearly with an increase in the number of UEs supported by the eNodeB. It is therefore desirable to be able to allocate the memory used for UL HARQ buffers dynamically, so that more UEs can be supported by the eNodeB with limited memory size.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a transmission node in a wireless communication network. The transmission node includes: a receiving unit for receiving a plurality of data packets transmitted from nodes in the network, wherein in each transmission time interval (TTI), a set of the nodes are scheduled to transmit a set of data packets to the transmission node, and each of the set of nodes transmits one data packet to the transmission node in one TTI. The transmission node also includes a memory unit connected to the receiving unit. The memory unit includes a first number of memory blocks for storing the plurality of data packets, where the set of data packets transmitted in one TTI are stored in one memory block corresponding to the TTI, and wherein each of the first number of memory blocks comprises a plurality of sub-memory blocks, and wherein each of the sub-memory blocks stores one data packet. The transmission node further includes a processor connected to the memory unit. The processor includes a buffer control unit for allocating the set of data packets to the sub-memory blocks and releasing the sub-memory blocks after the first number of TTIs upon receipt of the set of data packets, and a data processing unit for decoding the data packets. The transmission node transmits acknowledgment information based on a result of the decoded data packets.

In another embodiment, the present invention provides a method of operating a transmission node in a wireless communication network. The method includes: receiving a set of data packets transmitted from a set of nodes in the network in one transmission time interval (TTI), wherein each of the set of nodes transmits one data packet to the transmission node in the TTI, storing the set of data packets to a memory block corresponding to the TTI, wherein each of the set of data packets is stored in a separate sub-memory block of the memory block, decoding each of the set of data packets, transmitting acknowledgement information based on a result of the decoding, and releasing sub-memory blocks after a first number of TTIs upon receipt of the set data packets stored in the sub-memory blocks.

Figure 3:
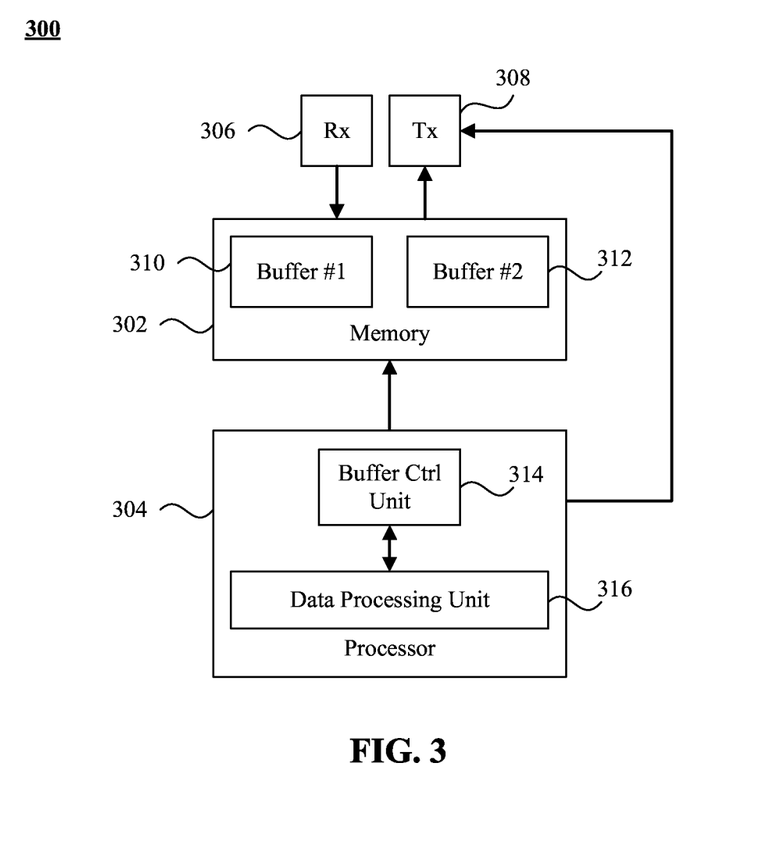
FIG. 3 is a schematic block diagram of an internal structure of a transmission node in accordance with an embodiment of the invention

Referring now to FIG. 3, an internal structure of a transmission node 300 in a wireless communication network in accordance with an embodiment of the invention is shown. The transmission node 300 may be the eNodeB 104 or a relay node (not shown), which transmits downlink data to mobile nodes in an area covered by the transmission node 300, for instance, the cell 102 covered by the eNodeB 104. The mobile nodes may be the UEs 106_0~106_N, or mobile relay nodes (not shown), as is known in the art.

The transmission node 300 has a memory unit 302, a processor 304 connected to the memory unit 302, and receiving and transmitting units 306 and 308 connected to the memory unit 302. The memory unit 302 comprises a first HARQ buffer 310 for storing data packets or combined data packets, and a second HARQ buffer 312 with a same structure of the first HARQ buffer 310 for storing combined data packets. The processor 304 includes a buffer control unit 314 for allocating the data packets received by the receiving unit 306 to the memory unit 302, and a data processing unit 316 for decoding the data packets. The processor 304 preferably comprises a processor of an MCU (microcontrol unit) of the transmission node 300, or alternatively could comprise a separate processor within the transmission node 300.

Figure 4:
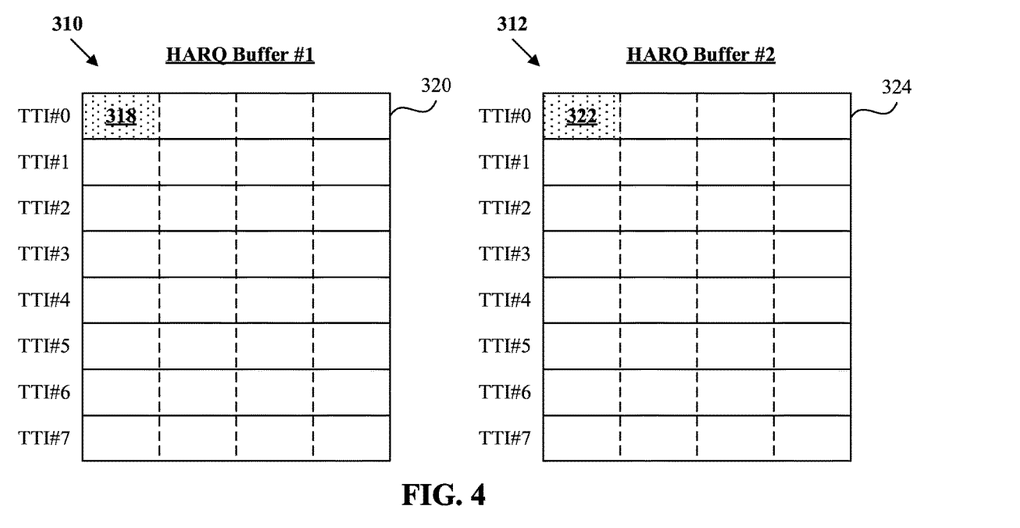
FIG. 4 is a HARQ buffer structure in accordance with an embodiment of the present invention.

Referring to FIG. 4, a HARQ buffer structure in accordance with an embodiment of the present invention is shown. Each of the first and second HARQ buffers 310 and 312 includes a first number of memory blocks for storing the data packets or combined data packets, wherein each of the first number of memory blocks corresponds to a transmission time interval (TTI). In a preferred embodiment, the first number is determined by duration of a HARQ process. For example, if a HARQ process lasts for 8 TTIs, the first number is 8. In the cell 102, only a set of UEs among the UEs 106_0-106_N are scheduled to transmit the UL data packets to the eNodeB 104 in one TTI, and each of the set of UEs transmits one data packet to the eNodeB 104 at one time. Each memory block comprises a plurality of sub-memory blocks, so that each of the data packets received in the TTI is allocated to a separate sub-memory block of the memory block corresponding to the TTI by the buffer control unit 314.

For example, in TTI#0, UE 106_0 is scheduled and transmits an original data packet to the eNodeB 104. The receiving unit 306 receives the original data packet, and the buffer control unit 314 allocates the original data packet into a sub-memory block 318 of a memory block 320 corresponding to TTI#0 in the first HARQ buffer 310.

If the original data packet in the sub-memory block 318 is successfully decoded by the data processing unit 316, the transmitting unit 308 transmits an acknowledgement of the original data packet to the UE 106_0, and the buffer control unit 314 releases the sub-memory block 318.

If the data processing unit 316 fails to decode the original data packet, the transmitting unit 308 transmits a negative-acknowledgement of the data packet to the UE 106_0 to ask the UE 106_0 to re-transmit the original data packet, and the buffer control unit 314 retains the sub-memory blocks 318 and 322 for re-transmission. In a preferred embodiment, the buffer control unit 314 releases the sub-memory block 318 after duration of a HARQ process, e.g., 8 TTIs, upon receipt of the original data packet.

Upon receipt of a re-transmitted data packet, the data processing unit 316 combines the original data packet stored in the sub-memory block 318 with the re-transmitted data packet to a combined data packet, and the buffer control unit 314 allocates the combined data packet into a sub-memory block 322 of a memory block 324 corresponding to TTI#0 in the second HARQ buffer 312.

If the data processing unit 316 again fails to decode the re-transmitted data packet, the transmitting unit 308 transmits another negative-acknowledgement of the re-transmitted data packet to the UE 106_0 to ask the UE 106_0 to re-transmit the original data packet, and the buffer control unit 314 retains the sub-memory blocks 318 and 322 for re-transmission. Upon receipt of another re-transmitted data packet, the data processing unit 316 combines the combined data packet stored in the sub-memory block 322 with the re-transmitted data packet to a new combined data packet, and the buffer control unit 314 allocates the new combined data packet into the sub-memory block 318 of the memory block 320 corresponding to TTI#0 in the first HARQ buffer 310. The sub-memory blocks 318 and 322 perform as standby sub-memory blocks of each other to alternately store a combined data packet upon receipt of a re-transmitted data packet, while a previously combined data packet is stored in the other sub-memory block of the two.

As shown in FIG. 4, in a preferred embodiment, a number of the sub-memory blocks in each memory block is fixed and is determined by a maximum number of the set of UEs, e.g., 4 UEs, and a size of each sub-memory block is fixed and is determined by a maximum size of a data packet transmitted by one UE. Each data packet corresponds to a set of unique identification information available in the transmission node 300 indicating a UE from which the data packet was transmitted and the TTI in which the data packet was transmitted, HARQ_ID on which the UE has sent the data packet and transmission count of the data packet. The buffer control unit 314 allocates the combined data packets to the sub-memory blocks 318 and 322 retained for re-transmission based on the unique identification information.

Figure 5:
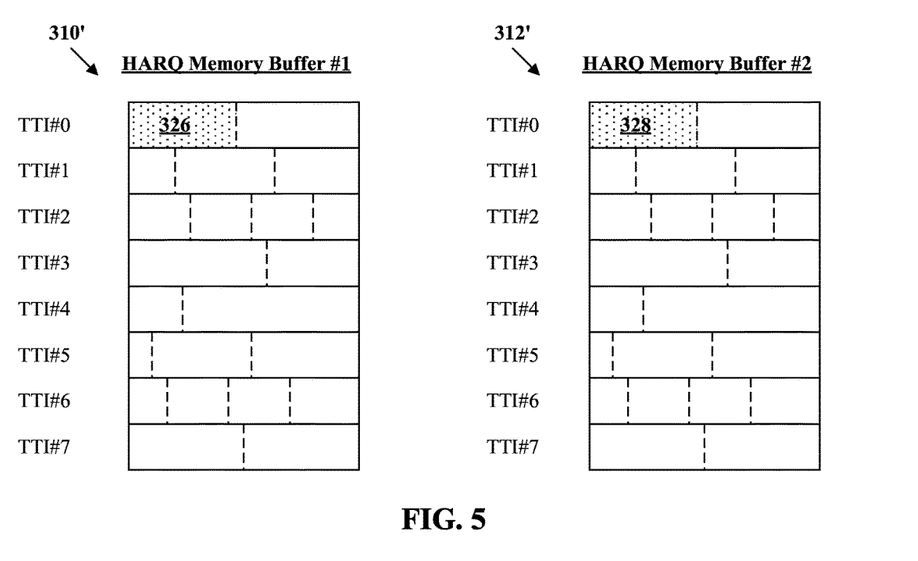
FIG. 5 is a HARQ buffer structure in accordance with another embodiment of the present invention.

Referring now to FIG. 5, a structure of first and second HARQ buffers 310' and 312' in accordance with another embodiment of the present invention is shown. In another preferred embodiment, sizes of the sub-memory blocks in one memory block corresponding to one TTI are dynamically allocated according to sizes of the UL data packets received in the TTI. The buffer control unit 314 allocates the combined data packets to the sub-memory blocks 326 and 328 retained for re-transmission based on the unique identification information and the size of the data packet.

Figure 6:
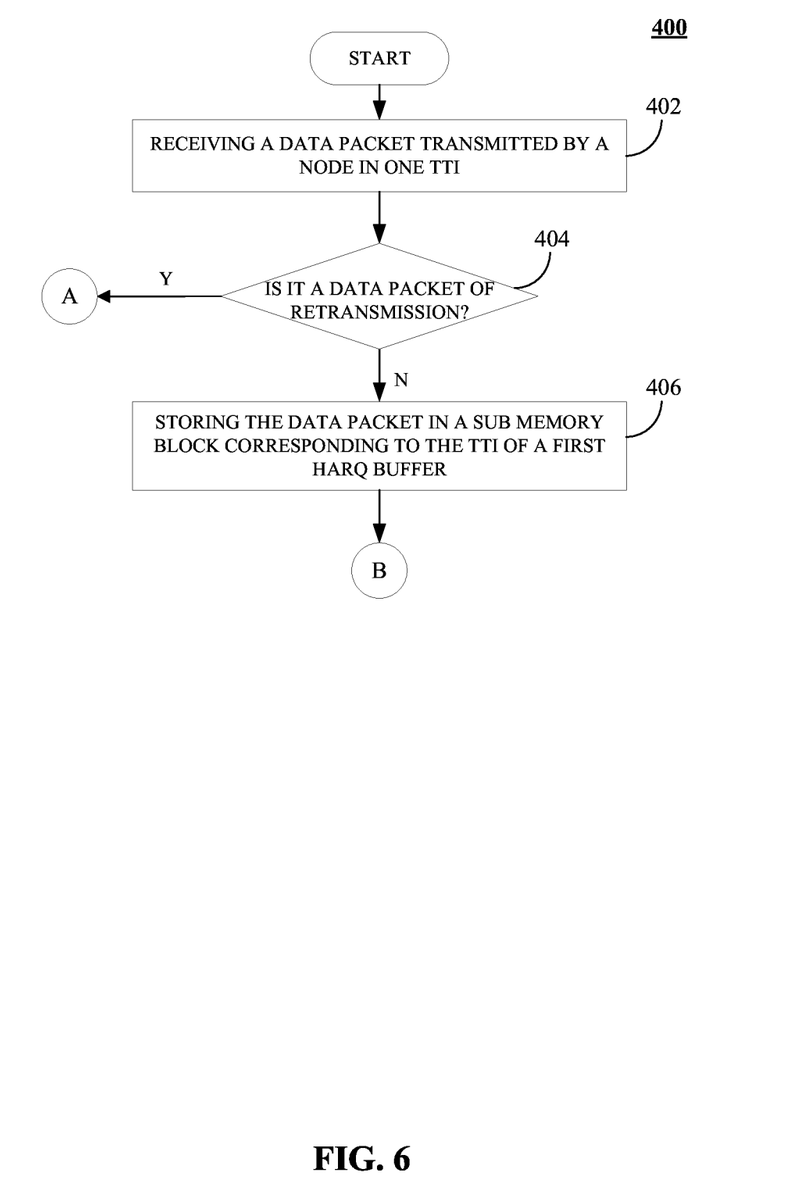
FIGS. 6-8 are a series of flow charts of transmission node operation in a wireless communication network in accordance with an embodiment of the invention.
Figure 7:
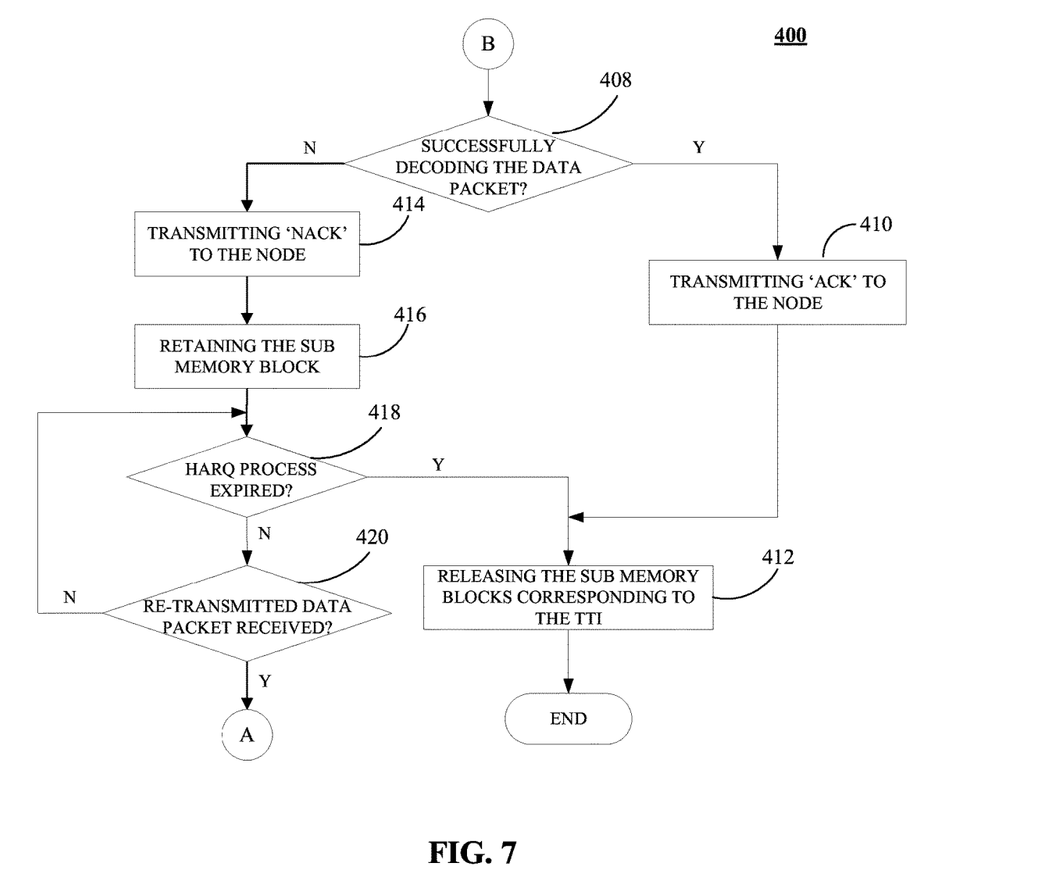
Figure 8:
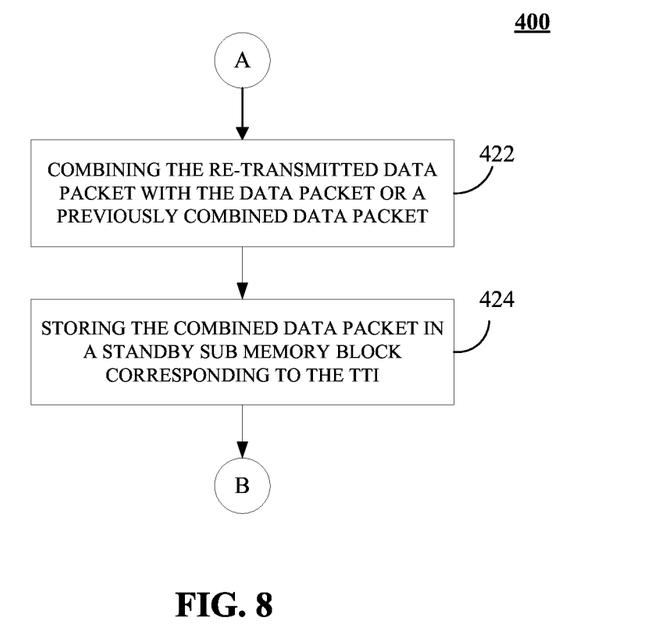

FIGS. 6-8 are a series of flow charts showing the steps of a method of operating a transmission node to dynamically allocate HARQ buffers.

At step 402, the eNodeB 104 receives a set of data packets transmitted by a set of UEs scheduled in one TTI, wherein each of the set of UEs transmits one data packet in the TTI. For example, in TTI#0, the set of data packets include one original data packet transmitted by the UE 106_0.

At step 404, the eNodeB 104 checks whether the original data packet is a re-transmitted data packet based on information such as a current-transmission-count available in the eNodeB 104.

At step 406, if the original data packet is not a re-transmitted data packet, the eNodeB 104 stores the original data packet in the memory unit 302. In a preferred embodiment, the memory unit comprises two HARQ buffers 310 and 312, each of which comprises a plurality of memory blocks corresponding to different TTIs in a HARQ process, e.g., TTI#0-TTI#7. A number of the plurality of memory blocks in each HARQ buffers is determined by duration of one HARQ process. The eNodeB 104 stores each of the set of data packets in a separate sub-memory block of a memory block corresponding to the TTI. For example, as shown in FIG. 4, the data packet transmitted by the UE 106_0 is stored in the sub-memory block 318 of the memory block 320 which corresponds to TTI#0.

In a preferred embodiment, a number of the sub-memory block in a memory block is fixed and is determined by a maximum number of the set of UEs that can be scheduled in one TTI, e.g., 4 UEs, and a size of each of the sub-memory blocks is fixed and is determined by a maximum size of a data packet that can be transmitted by one UE.

In another preferred embodiment, a size of each memory block is fixed and determined by a total size of data packets that can be transmitted in one TTI. Referring to FIG. 5, the eNodeB 104 dynamically allocates a sub-memory block 326 based on a size of the data packet. As a result, each memory block comprises sub-memory blocks with different sizes.

At step 408, the eNodeB 104 performs decoding on the data packet. In a preferred embodiment, the decoding includes cyclic redundancy check (CRC), which is known in the art.

At step 410, the eNodeB 104 transmits 'ACK' to the UE 106_0 if the data packet is successfully decoded to acknowledge receipt of the data packet.

At step 412, the eNodeB 104 releases the sub-memory blocks 318 and 322 corresponding to the TTI if the data packet is successfully decoded.

On the other hand, if the data packet is not successfully decoded, at step 414, the eNodeB 104 transmits 'NACK' to the UE 106_0 to inform the UE 106_0 to re-transmit the data packet, and the sub-memory blocks 318 and 322 are retained for re-transmission at step 416.

At steps 422 and 424, upon receipt of the re-transmitted data packet at step 420, the eNodeB 104 performs HARQ combining to combine the retransmitted data packet with the original data packet stored in the sub-memory block 318, and stores the combined data packet into the sub-memory block 322 of the memory block 324 corresponding to TTI#0 in the second HARQ buffer 312.

Back to step 408, if the data processing unit 316 again fails to decode the re-transmitted data packet, the transmitting unit 308 transmits another negative-acknowledgement of the re-transmitted data packet to the UE 106_0 at step 414 to ask the UE 106_0 to re-transmit the data packet, and at step 416, the buffer control unit 314 retains the sub-memory blocks 318 and 322 for re-transmission.

Upon receipt of a new re-transmitted data packet at step 420, the data processing unit 316 combines the new re-transmitted data packet with the combined data packet stored in the sub-memory block 322 to a new combined data packet, and the buffer control unit 314 allocates the new combined data packet into the sub-memory block 318 of the memory block 320 corresponding to TTI#0 in the first HARQ buffer 310. The sub-memory blocks 318 and 322 perform as standby sub-memory blocks of each other to alternately store a combined data packet upon receipt of a re-transmitted data packet, while a previously combined data packet is stored in the other sub-memory block of the two.

In a preferred embodiment, the data packet corresponds to a set of unique identification information available in the eNodeB 104 indicating the UE 106_0 from which the data packet was transmitted and TTI#0 in which the data packet was transmitted, so that the eNodeB 104 stores the original data packet of the combined data packet in the retained sub-memory block 318 or 322 based on the unique identification information.

In another preferred embodiment, the eNodeB 104 stores the original data packet or the combined data packet in the retained sub-memory block 326 or 328 based on the unique identification information and the size of the data packet.

At steps 418 and 412, the eNodeB 104 releases the sub-memory blocks 318 and 322 after a plurality of TTIs upon receipt of the original data packet, wherein a number of the plurality of TTIs is determined by duration of one HARQ process, e.g., 8 TTIs.

Therefore, by dynamically allocating data packets into sub-memory blocks corresponding to different UEs and TTIs in a HARQ process, and releasing the sub-memory blocks when a HARQ process is expired, the amount of memory used for HARQ buffers are reduced.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A transmission node in a wireless communication network, comprising:
  a receiving unit for receiving a plurality of data packets transmitted from nodes in the wireless communication network, wherein in each transmission time interval (TTI), a set of the nodes are scheduled to transmit a set of data packets to the transmission node, wherein each node of the set of nodes transmits one data packet to the transmission node in one TTI;
  a memory unit connected to the receiving unit, wherein the memory unit includes a first buffer and a second buffer, wherein each of the first buffer and the second buffer includes a first number of memory blocks for storing the plurality of data packets, wherein the set of data packets transmitted in a particular TTI are stored in one memory block corresponding to the particular TTI in the first buffer, wherein each of the first number of memory blocks comprises a plurality of sub-memory blocks, wherein each of the plurality of sub-memory blocks stores one data packet;
  a processor connected to the memory unit, comprising:
    a buffer control unit for allocating the set of data packets into the plurality of sub-memory blocks and releasing the plurality of sub-memory blocks after a first number of TTIs upon receipt of the set of data packets; and
    a data processing unit for decoding the plurality of data packets; and
  a transmitting unit for transmitting acknowledgment information based on a result of the decoded plurality of data packets, wherein the transmitting unit transmits a negative acknowledgement and the buffer control unit retains a sub-memory block when the data processing unit fails to decode a data packet.

2. The transmission node of claim 1, wherein the first number is determined by a duration of a Hybrid Automatic Repeat Request process.

3. The transmission node of claim 1, wherein when the data processing unit succeeds in decoding a data packet transmitted from a node, the transmitting unit transmits an acknowledgement of the data packet to the node, and the buffer control unit releases a sub-memory block used for storing the data packet.

4. The transmission node of claim 1, wherein if-when the data processing unit fails to decode a data packet transmitted from a node, the transmitting unit transmits a negative-acknowledgement of the data packet to the node, and the buffer control unit retains a sub-memory block that stores the data packet for re-transmission.

5. The transmission node of claim 4, wherein the node re-transmits the data packet upon receipt of the negative-acknowledgement.

6. The transmission node of claim 5, wherein the data packet corresponds to a set of unique identification information available in the transmission node that indicates a node from which the data packet was transmitted and a TTI in which the data packet was transmitted.

7. The transmission node of claim 5, wherein the buffer control unit allocates the data packet re-transmitted from the node to the sub-memory block retained for re-transmission based on unique identification information.

8. The transmission node of claim 5, wherein the data processing unit combines the data packet re-transmitted from the node with the data packet to form a combined data packet, and the buffer control unit allocates the combined data packet to a sub-memory block corresponding to a TTI in the second buffer.

9. The transmission node of claim 1, wherein each memory block comprises a second number of sub-memory blocks, wherein the second number is fixed and is determined by a maximum number of the set of the plurality of nodes scheduled in one TTI, and wherein a size of each of the second number of sub-memory blocks is fixed and is determined by a maximum size of a data packet transmitted by one node.

10. The transmission node of claim 9, wherein a size of a sub-memory block is dynamically allocated according to a size of the data packet.

11. The transmission node of claim 10, wherein the buffer control unit allocates the data packet re-transmitted from the node to the sub-memory block retained for re-transmission based on unique identification information, and the size of the data packet.

12. A method of operating a transmission node in a wireless communication network, comprising:
receiving a first set of data packets transmitted from a set of nodes in the network in a first transmission time interval (TTI), wherein each of the set of nodes transmits one data packet to the transmission node in the first TTI;
storing the first set of data packets to a memory block corresponding to the first TTI in a first buffer, wherein each of the first set of data packets is stored in a separate sub-memory block of the memory block;
decoding a first particular data packet of the first set of data packets;
transmitting a positive acknowledgement information based on a positive result of the decoding;
based on a negative result of the decoding:
transmitting a negative acknowledgement information;
retaining a sub-memory block in the first buffer in which a particular data packet is stored;
in response to a first number of transmission time intervals not having elapsed, receiving a second set of data packets in a second TTI, wherein the second set of data packets includes a second particular data packet, wherein the second particular data packet is a retransmisssion of the first particular data packet;
decoding the second particular data packet;
producing a combined data packet by combining the first particular data packet and the second particular data packet using Hybrid Automatic Repeat Request (HARQ) combining; and
storing the combined data packet in a memory block corresponding to the second TTI in a second buffer; and
releasing sub-memory blocks after the first number of TTIs upon receipt of the set data packets stored in the sub-memory blocks.

13. The method of claim 12, wherein the first number of TTIs is determined by duration of a Hybrid Automatic Repeat Request process.

14. The method of claim 12, wherein the step of transmitting a positive acknowledgement information includes transmitting an acknowledgement of a data packet to a node from which the data packet was transmitted and releasing a sub-memory block that stores the data packet, when the data packet is successfully decoded.

15. The method of claim 12, wherein the step of transmitting a negative acknowledgement information includes transmitting a negative-acknowledgement of a data packet to a node from which the data packet was transmitted and retaining a sub-memory block that stores the data packet for re-transmission, when the data packet is not successfully decoded.

16. The method of claim 15, wherein each of the first set of data packets and the second set of data packets corresponds to a set of unique identification information available in the transmission node that indicates the node from which the data packet was transmitted and a TTI in which the data packet was transmitted.

17. The method of claim 16, further comprising receiving and allocating the second particular data packet re-transmitted from the node to the sub-memory block retained for re-transmission of the first particular data packet based on unique identification information.

18. The method of claim 12, further comprising dynamically allocating a sub-memory block of the memory block based on a size of the first data packet.

19. The method of claim 18, further comprising receiving and allocating the second particular data packet re-transmitted from the node to the sub-memory block retained for re-transmission of the first particular data packet based on the size of the first particular data packet.

20. A transmission node in a wireless communication network, comprising:
a memory unit including a first buffer and a second buffer, wherein:
each buffer includes a first number of memory blocks;
each memory block is configured to store data packets received from a plurality of communication nodes during a single transmission time interval and includes a second number of memory sub-blocks;
each memory sub-block is configured to hold one data packet; and circuitry configured to:
    receive a first set of data packets during a first transmission time interval;
    store the first set of data packets at a third number of memory sub-blocks at a first memory block at the first buffer;
    receive a second set of data packets during a second transmission time interval;
    store the second set of data packets at a fourth number memory sub-blocks at a second memory block at the first buffer;
    receive a third set of data packets during a third transmission interval;
    perform Hybrid Automatic Repeat Request (HARQ) combining to combine a first particular data packet stored at the second memory block with a second particular data packet from the third set of data packets to create a combined data packet, wherein the second particular data packet is a retransmitted copy of the first particular data packet; and
    store the combined data packet into a memory sub-block at a third memory block at the second buffer.

* * * * *